Oct. 30, 1928.
L. F. LAMPLOUGH
1,689,206
APPARATUS FOR TREATING VULCANIZABLE MATERIAL
Original Filed Dec. 16, 1926   2 Sheets-Sheet 1
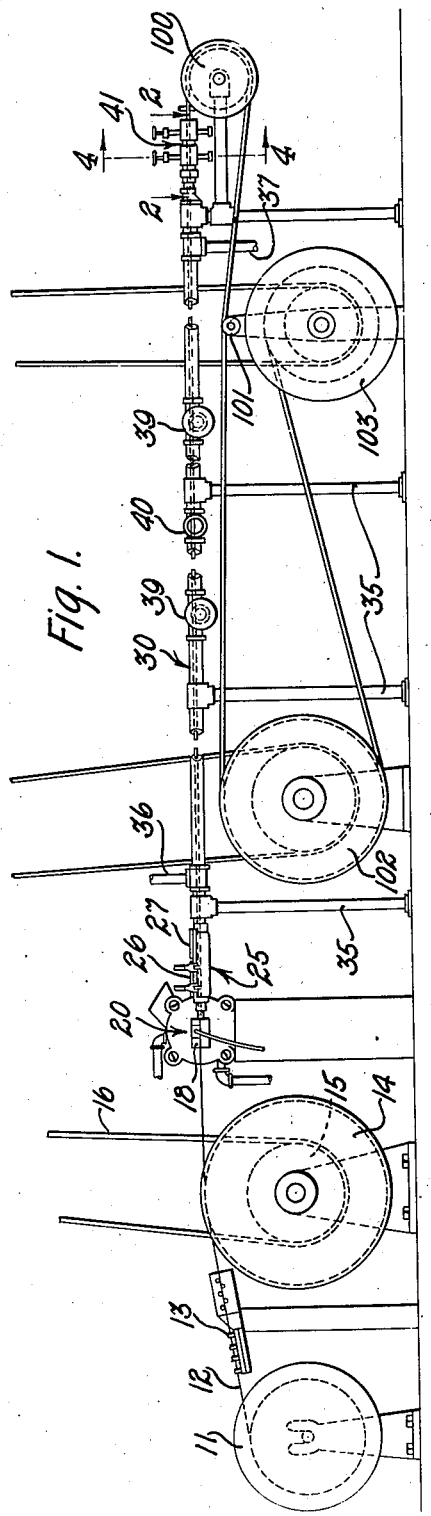
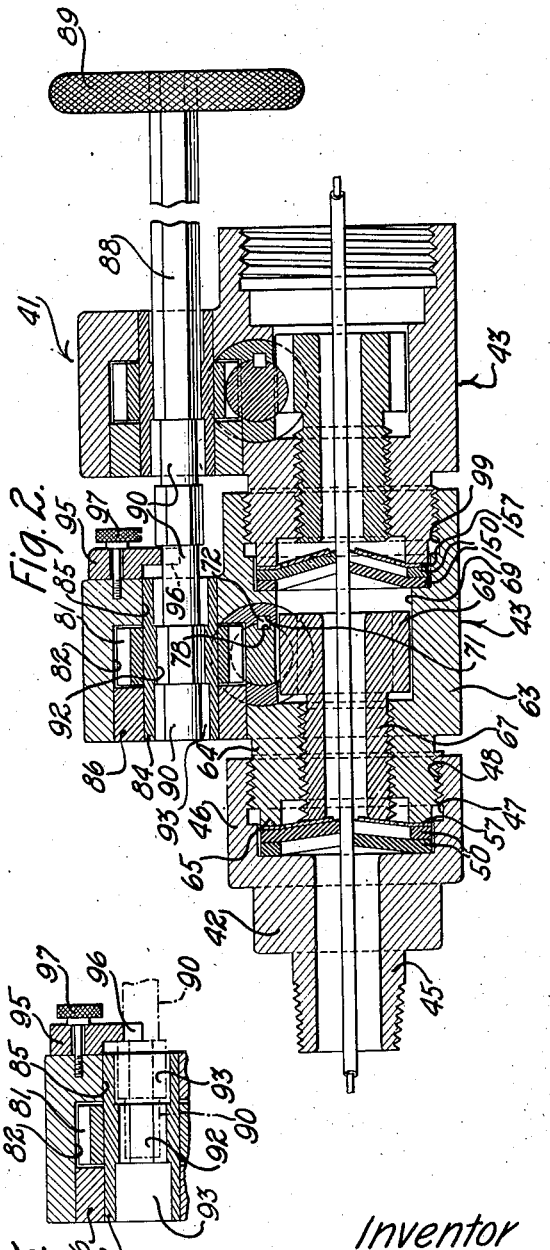
Inventor
Leslie F. Lamplough
by H. A. Cattron Att'y.

Oct. 30, 1928.
L. F. LAMPLOUGH
1,689,206
APPARATUS FOR TREATING VULCANIZABLE MATERIAL
Original Filed Dec. 16, 1926    2 Sheets-Sheet 2
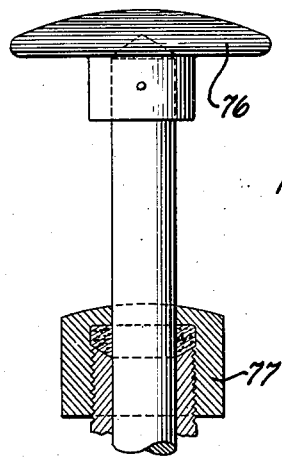
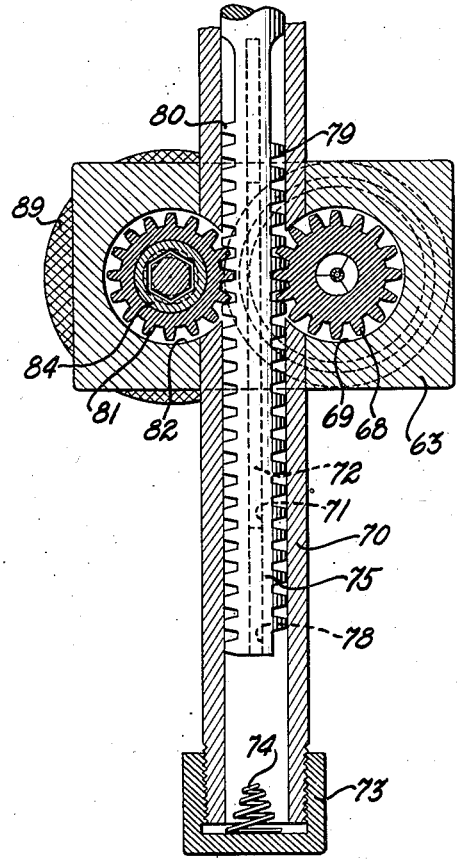
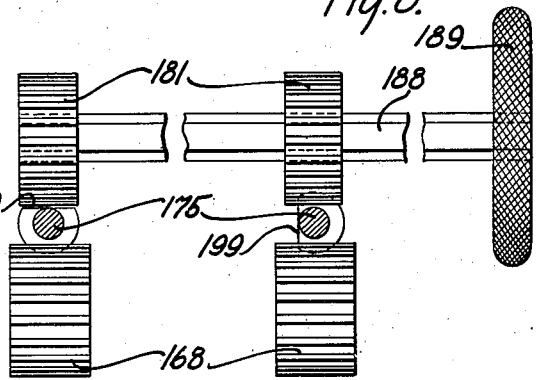
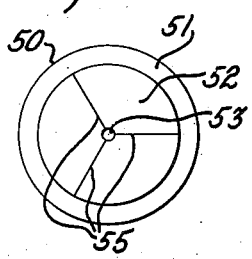
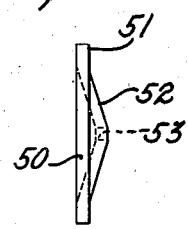
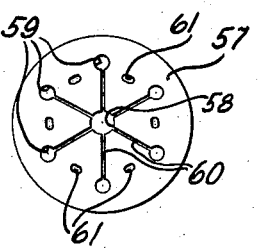
Inventor
Leslie F. Lamplough
by　　　　　Att'y.

Patented Oct. 30, 1928.

1,689,206

UNITED STATES PATENT OFFICE.

LESLIE FAWCETT LAMPLOUGH, OF CHICAGO, ILLINOIS, ASSIGNOR TO WESTERN ELECTRIC COMPANY, INCORPORATED, OF NEW YORK, N. Y., A CORPORATION OF NEW YORK.

APPARATUS FOR TREATING VULCANIZABLE MATERIAL.

Application filed December 16, 1926, Serial No. 155,194. Renewed March 22, 1928.

This invention relates generally to apparatus for treating vulcanizable material, and more particularly to apparatus for effectively sealing a vulcanizing chamber through which the material is drawn.

The object of the invention is to provide a pressure seal for use in apparatus for vulcanizing materials which is simple in construction and which permits the withdrawal of the material from a vulcanizing medium, but which prevents the escape of an excessive amount of the vulcanizing medium.

In accordance with one embodiment of the invention, a core of material, such as a wire or cable, is passed through a mechanism which extrudes a coating of unvulcanized insulating material upon the strand as it is advanced therethrough. Connected to the extruding mechanism is a vulcanizing chamber into which the coated strand passes directly without access to the atmosphere and in which the insulating material is subjected to sufficient heat and pressure to vulcanize it. The strand, now covered with a vulcanized insulating coating, emerges from the vulcanizing chamber through a seal, forming the subject-matter of this invention, which comprises a connecting member and a plurality of selectively operable sealing units. The seal permits the withdrawal of the sheathed strand from the vulcanizing chamber but tends to maintain the pressure of the vulcanizing medium within the chamber.

It is believed that the invention will be clearly understood from the following detailed description taken in connection with the annexed drawings illustrating one embodiment of the invention, and in which Fig. 1 is a side elevation of an apparatus embodying the invention;

Fig. 2 is an enlarged horizontal sectional view taken on line 2—2 of Fig. 1;

Fig. 3 is an enlarged fragmentary sectional view similar to Fig. 2, showing a selective operating member in dotted lines in its inoperative position;

Fig. 4 is an enlarged vertical sectional view taken on line 4—4 of Fig. 1;

Fig. 5 is an enlarged detail view of a composition disk used in the seal;

Fig. 6 is an enlarged edge view thereof;

Fig. 7 is an enlarged detail view of a metal disk used in the seal, and

Fig. 8 is an enlarged diagrammatic view illustrating another embodiment of the invention.

In the drawings, in which like numerals designate like parts throughout the several views, embodiments of the invention are illustrated which are designated to cover electric wires with insulating coatings of rubber. An apparatus embodying the invention is illustrated in Figs. 1 to 7, inclusive, and comprises a supply reel 11 from which a wire 12 which is to be covered is drawn through a wire straightening device 13 of any desired form by means of a capstan 14 around which the wire passes. The capstan is driven through a pulley 15 by means of a belt 16 connected to a suitable source of power (not shown), at a speed slightly greater than that of the wire to relieve tension on the wire during its passage through a vulcanizing chamber, hereinafter described. From the capstan the wire passes through a head 18 of an extrusion mechanism, designated generally by the numeral 20, which is adapted to extrude a uniform coating of unvulcanized insulating material on the wire as it emerges from the head 18. The extrusion mechanism 20 may be of any well known type and is illustrated only diagrammatically since a complete description of its construction is not essential to completely understand the invention. It suffices to say that it is provided with a conveying screw which forces the insulating material under high pressure through a die around the wire as it passes through the extrusion head 18, which may be of any suitable type, the head which is disclosed in the copending application Serial No. 112,599, filed May 29, 1926 by R. C. Kivley, being one which gives very satisfactory results.

A connecting member 25 effects a pressure-tight connection between the head 18 and a vulcanizing chamber 30 directly into which the wire passes from the extrusion mechanism 20. The connecting member 25 may be of any suitable type, that described in the copending application Serial No. 112,600, filed May 29, 1926 by L. F. Lamplough, being one which gives satisfactory results. It suffices to say that the connecting member is provided with a quick opening door 26 to provide ready access to the wire passing therethrough and a sight glass 27 for examination of the wire therein. The vulcanizing chamber 30 is supported by a series of standards 35 and is provided with an inlet pipe 36 and an outlet pipe 37 for conveying a heated non-oxidizing medium, such as steam under pressure, into and out of the chamber. Located at intervals within the vulcanizing chamber 30 are a plurality of sheaves carried in castings 39 which guide the wire in its passage through the chamber, while an additional sight glass 40 is provided to permit examination of the wire within the tube at a point somewhat distant from the sight glass 27.

At the end of the vulcanizing chamber opposite the entrance end there is provided a seal 41 which permits the coated wire to be withdrawn from the vulcanizing chamber but which prevents the escape of more than a predetermined amount of the vulcanizing medium from the interior of the chamber. The seal 41 comprises in general a hollow coupling member 42 (Fig. 2) and a plurality of selectively operable sealing units 43—43. The coupling member 42 comprises a hollow member having a threaded end 45 for securing the member within the end of the vulcanizing chamber 30 and having an enlarged cup-like end portion 46 provided with an enlarged opening 47, a portion of the inner surface of which is provided with screw threads 48. A plurality of disks 50 (Figs. 2, 5 and 6) composed of a yieldable substance, such as rubber, are fitted within the opening 47 in the coupling member 42 near the inner side thereof, each of the disks 50 comprising a flat peripheral rim 51 and a conical central portion 52 provided with a central opening 53 and a plurality of radial slits 55 intersecting the central opening 53. A resilient metal disk 57 (Figs. 2 and 7) is fitted within the opening 47 adjacent the disks 50, which metal disk is provided with a central opening 58 through which the wire may freely pass, a series of openings 59 connected to the central opening 58 by radial slots 60 and another series of openings 61, all of which are provided to render the central portion of the disk 57 flexible. The disks 50 and 57 are arranged within the opening 47 so that the slits in each disk are staggered with respect to those in the adjacent disks.

Since the selectively operable sealing units 43—43 are of identical structure, it will suffice to describe only one of them in detail. The sealing unit 43 adjacent the coupling member 42 comprises a housing member 63 having an internally and externally threaded hollow head 64 thereon which is secured to the coupling member 42 by the coaction of the external threads on the head 64 with the threads 48 on the coupling member. The outer end of the head 64 is provided with an annular flange 65 to cooperate with the inner side of the opening 47 in the coupling member 42 to tightly grip the rims of the disks 50 and 57. Fitted within the internally threaded portion of the head 64 is a threaded shank 67 having an axial bore therethrough and having a gear 68 formed on one end thereof, which gear operates within a recess 69 provided within the housing 63.

Extending vertically through the housing 63 is a tube 70 (Figs. 2 and 4) having a groove 71 formed on one side of the inner surface thereof, in which groove is inserted an elongated key 72, and having a cap 73 secured upon the lower end to which cap a coil spring 74 is secured. A plunger 75 having a knob 76 on the upper end thereof is inserted within the tube 70 and is surrounded by a stuffing box 77 secured to the tube 70 to prevent escape of the vulcanizing medium, the plunger having a groove 78 formed on one side thereof to receive the key 72 in order to prevent rotation of the plunger within the tube 70. The plunger 75 is provided on one side with a series of rack teeth 79 which mesh with the teeth of the gear 68 formed on the shank 67 and on the opposite side with a series of rack teeth 80 which mesh with a gear 81 mounted in an opening 82 formed in the housing 63 adjacent the opening 69, the tube 70 having suitable openings provided therein through which the gears 68 and 81 protrude in order to mesh with the racks formed on the plunger 75.

The gear 81 is rigidly secured to a sleeve 84 which may rotate in an opening 85 provided in one wall of the housing 63 and a ring 86 which effects a tight fit with the opening 82 is forced within that opening to retain the gear 81 therein. Slidably mounted within the sleeve 84 is a hexagonal shaft 88 having a hand wheel 89 on one end thereof and having circular portions 90—90 formed thereon, which portions have a diameter smaller than that of the hexagonal portions of the shaft 88. A central portion 92 (Fig. 3) of the inner surface of the sleeve 84 is of a hexagonal cross-section into which the hexagonal portion of the shaft 88 fits snugly, while the adjacent portions 93—93 of this inner surface are of circular cross-section and of greater diameter than the hexagonal portion 92. A stop 95 having a fork-shaped portion 96 designed to partially encircle one of the rounded portions 90 of the shaft 88 in close proximity thereto is secured to the housing 63 by means of a knurled screw 97.

An outer portion 99 of the opening 69 in the housing 63 is formed similarly to the enlarged opening 47 in the connecting member 42 and in this outer portion 99 may be inserted yieldable disks 150 and a metal disk 157 which are identical with the disks 50 and 57 located in the opening 47 of the connecting member 44. A second sealing unit may be secured within the opening 99, as shown in Fig. 2, in a manner similar to that in which the above described sealing unit is secured within the coupling member 42 to grip the rims of the disks 150 and 157 firmly in the position shown, the shaft 88 also extending through the second sealing unit and cooperating with a sleeve therein corresponding to the above mentioned sleeve 84 for the purpose of selectively connecting the shaft 88 to the operating mechanism within the second sealing unit. Although only two sealing units are disclosed, it is, of course, possible to employ as many of these units as it is desired, the number of units employed depending upon the degree of sealing effect desired. The units are interchangeable and are so constructed that the individual units may operate successfully regardless of the number of units employed.

The vulcanized wire emerges from the vulcanizing chamber 30 through the seal 41 and is drawn over a sheave 100 (Fig. 1) and an idler 101 by means of a capstan 102 around which the wire passes before being wound upon a take-up reel 103, which capstan and reel are suitably driven from a source of power (not shown) by means of pulleys and belts.

Assuming first that it is desired to actuate a plurality of the sealing units simultaneously, the operation of this embodiment of the invention is as follows: The end of the uncovered wire 12 is threaded through the wire straightening device 13, around the capstan 14, through the head 18 of the extrusion device, through the connecting member 25, the vulcanizing tube 30, and the seal 41, around the sheave 100 and capstan 102, and onto the take-up reel 103. The door 26 is clamped tightly in place and the seal 41 is released. Power is then applied to the various driven members and a quantity of unvulcanized insulating material, such as a rubber compound, is inserted into the extrusion mehanism which forms a compact, uniform sheathing of the unvulcanized material around the wire. The operator, upon looking into the sight glass 27, near the extrusion head, may note when the insulating material begins to appear within the vulcanizing chamber, and may then immediately admit the hot vulcanizing medium into the vulcanizing chamber through the pipe 36, whereupon the vulcanizing process begins.

The shaft 88 forming a part of the seal 41 is forced to the left into the position shown in Fig. 2, in which position the shaft engages the associated sleeves in both of the sealing units. Since the operation of both units is the same, the operation of only one will be described, it being understood that both units are operated simultaneously by the shaft 88 in the same manner. The hand wheel 89 secured upon the shaft 88 is rotated, whereupon the gear 81 will be rotated, thereby reciprocating the plunger 75 through the rack teeth 80 which mesh with the gear 81, which plunger in turn rotates the gear 68 through the rack teeth 79 formed therein. When the gear 68 is rotated, the threads formed on the shank 67 upon which the gear 68 is formed coact with the internal threads on the hollow head 64 to cause a movement of the shank in a direction parallel to the axis of the gear 68, the direction of this movement depending upon the direction of rotation of the gear 68. For the purpose of causing the sealing units to become operative, this movement of the shank 67 will be to the left, as seen in Fig. 2, whereby the end of the shank 67 will press against the metal disk 57 and thereby force the yieldable disk 50 tightly against the vulcanizable coating on the wire passing therethrough. The gear 67 is of sufficient width to permit it to traverse from one end to the other of the opening 69 in the housing 63 without shifting the pitch line between it and the rack teeth 79 on the plunger 75. The yieldable disks effect a substantially pressure-tight seal with the insulating coating because of their dished form, for when force is applied to the apex of the conical portions the altitude is reduced, and since the outer rims of the disks are confined and the slant height of the conical portions is constant, it results that the peripheries of the central opening 81 are forced tightly into contact with the vulcanized coating.

The coated wire continues through the vulcanizing tube 30, where it is subjected to a vulcanizing temperature and pressure, and by the time the wire emerges through the seal 41 the coated material is vulcanized to the desired degree. The pressure upon the disks 50, 150, 57 and 157 within the seal 41 is adjusted so that a small amount of the vulcanizing medium escapes through the central openings therein around the insulating sheath as it passes therethrough, the escaping vulcanizing medium thereby acting as a cushion between the sheath and the disks which tends to prevent damage to the insulation. Sufficient time elapses during the travel of the wire around the sheave 100, the capstan 102 and onto the take-up reel 103 for the insulating material to cool.

Assuming now that it is desired to operate the sealing units 43 independently, the operation of the device is as follows: The operations described above are performed down to the point where the shaft 88 is operated, when instead of forcing the shaft 88 to the left, as seen in Fig. 2, it will be moved to the right, as seen in dotted lines in Fig. 3, until the end of the hexagonal portion which coacts with the sleeve 84 contacts with the stop 95 when the circular portions 90 on the shaft 88 will be within the hexagonal portions 92 of the sleeves 84, so that upon rotation of the shaft 88 no motion will be transmitted to the gears 81 and hence neither of the sealing units will be operated by the shaft 88. The individual plungers 75 may then be reciprocated to rotate the gears 68 to cause the shanks 67 to force the disks against the coating on the wire being treated. It will be seen from the above description that by means of this embodiment of the invention any number of sealing units may be employed and actuated individually, or that by means of the shaft 88, the total number of sealing units employed may be actuated simultaneously to permit the withdrawal of a sheathed core while preventing the escape of an excessive amount of vulcanizing medium.

A modification of the invention is illustrated diagrammatically in Fig. 8, by means of which it is possible to selectively operate any number of the sealing units by means of a common shaft. In this modification of the invention there is provided a shaft 188 having a hand wheel 189 secured upon the end thereof and having rigidly secured thereto a plurality of gears 181, which mesh with rack teeth formed upon plungers 175, the rack teeth in turn meshing with gears 168 corresponding to the gears 68 in the modification illustrated by Figs. 1 to 7, inclusive. The plungers 175 may be rotated about their axes to cause flattened portions 199 formed thereon to be placed adjacent the gears 181 so that when a gear 181 adjacent the flattened portion 199 is rotated by means of the shaft 188 the teeth upon the gear will not transmit motion to the plunger 175, and consequently the gear 168 associated with that particular plunger will not be rotated to cause the sealing disks in that unit to engage the coating upon the wire passing therethrough. It will be seen that in this modification of the invention it is possible by rotating the plungers 175 until the flattened portions 199 thereon are adjacent the gears 181, to actuate the sealing units individually, or by rotating any or all of the plungers 175 until the rack teeth thereon mesh with the gears 181 it is possible to simultaneously actuate any number of the sealing units by a single operation of the shaft 188.

In either embodiment of the invention, it is impossible to force the yieldable disks too tightly into contact with the coating on the wire because the rack teeth on the plungers which coact with the gears driving the shanks which press against the disks cease at the point at which further pressure would cause a seal to bind. When the plungers are forced past the point where the rack teeth engage the gears they contact with and tend to compress the springs secured upon the bottoms of the tubes. When pressure on the plungers is released the springs press the plungers upwardly in such a position with respect to the gears that if the plungers are again manually raised the rack teeth immediately mesh with the gears.

What is claimed is:

1. In an apparatus for treating vulcanizable material, a vulcanizing chamber, means for admitting a vulcanizing medium into the chamber under pressure, means for advancing the vulcanizable material through the chamber, and a seal for permitting the material to be withdrawn from the chamber and for retaining the vulcanizing medium within the chamber comprising a plurality of selectively operable sealing units.

2. In an apparatus for treating vulcanizable material, a vulcanizing chamber, means for admitting a hot, non-oxidizing vulcanizing medium into the chamber under pressure, means for advancing a core sheathed with a vulcanizable material through the chamber, and a seal for permitting the withdrawal of the sheathed core from the chamber and for retaining the vulcanizing medium within the chamber comprising a member for connecting the seal to the chamber and a plurality of interchangeable, selectively operable sealing units.

3. In an apparatus for treating vulcanizable material, a vulcanizing chamber, means for admitting a hot, non-oxidizing vulcanizing medium into the chamber under pressure, means for advancing a core sheathed with a vulcanizable material through the chamber, and a seal for permitting the withdrawal of the sheathed core from the chamber and for retaining the vulcanizing medium within the chamber comprising a hollow member for connecting the seal to the chamber, a plurality of sealing units, and means for selectively operating a desired number of the units.

4. In an apparatus for treating vulcanizable material, a vulcanizing chamber, means for admitting a hot, non-oxidizing vulcanizing medium into the chamber under pressure, means for advancing a core sheathed with a vulcanizable material through the chamber, and a seal for permitting the withdrawal of the sheathed core from the chamber and for retaining the vulcanizing medium within the chamber comprising a hollow member for connecting the seal to the chamber, a plurality of sealing units, and means for operating each unit individually.

5. In an apparatus for treating vulcanizable material, a vulcanizing chamber and a seal therefor comprising a plurality of interchangeable sealing units, means for selectively operating a desired number of the units, simultaneously, and means for operating each unit individually.

6. In an apparatus for treating vulcanizable material, a pressure seal comprising a plurality of sealing units, each unit provided with means for engaging the sheathing on a strand sheathed with a vulcanizable material, and means for operating a desired number of the units simultaneously to cause the sheath-engaging means to become effective.

7. In an apparatus for treating vulcanizable material, a pressure seal comprising a plurality of sealing units, each unit provided with means for engaging the sheathing on a strand sheathed with a vulcanizable material, means for operating a desired number of the units simultaneously, and means for operating each unit individually to cause the sheath-engaging means to become effective.

8. In an apparatus for treating vulcanizable material, a pressure seal comprising a plurality of sealing units, each unit provided with means for engaging the sheathing on a strand sheathed with a vulcanizable material, and selecting means which when in one position permits simultaneous operation of a plurality of the sealing units and when in another position permits individual operation of the units to cause the sheath-engaging means to become effective.

9. In an apparatus for treating vulcanizable material, a pressure seal comprising a plurality of sealing units, each unit provided with a cup-like depression in each of which are inserted a plurality of yieldable disks having central apertures through which a strand sheathed with a vulcanizable material may be drawn, and means for operating the units to force the peripheries of the apertures in the disks into contact with the sheathing on the strand.

10. In an apparatus for treating vulcanizable material, a pressure seal comprising a plurality of sealing units, each unit provided with a plurality of yieldable disks having central apertures through which a strand sheathed with a vulcanizable material may be drawn, a disk-engaging member, and a plunger for actuating the disk-engaging member, means for simultaneously operating a plurality of the plungers, and means for releasing the above mentioned operating means to permit individual operation of the plungers to cause the disk-engaging members to force the peripheries of the apertures in the disks into contact with the sheathing on the strand.

In witness whereof, I hereunto subscribe my name this 4 day of December A. D., 1926.

LESLIE FAWCETT LAMPLOUGH.